(12) United States Patent
Taber et al.

(10) Patent No.: US 8,158,101 B2
(45) Date of Patent: Apr. 17, 2012

(54) METHOD OF MAKING STABLE, HOMOGENEOUS POTASSIUM HYDRIDE DISPERSIONS

(75) Inventors: Douglass F. Taber, Newark, DE (US); Christopher G. Nelson, Bear, DE (US)

(73) Assignee: University of Delaware, Newark, DE (US)

( * ) Notice: Subject to any disclaimer, the term of this patent is extended or adjusted under 35 U.S.C. 154(b) by 254 days.

(21) Appl. No.: 12/700,161

(22) Filed: Feb. 4, 2010

(65) Prior Publication Data

US 2010/0270500 A1    Oct. 28, 2010

Related U.S. Application Data

(60) Provisional application No. 61/171,629, filed on Apr. 22, 2009.

(51) Int. Cl.
*C01B 6/04* (2006.01)
*C01B 6/34* (2006.01)
*C06B 43/00* (2006.01)

(52) U.S. Cl. ............. 423/646; 423/647; 252/188.25; 252/188.26

(58) Field of Classification Search .......... 423/646, 423/647; 252/188.25, 188.26
See application file for complete search history.

(56) References Cited

U.S. PATENT DOCUMENTS

| | | | |
|---|---|---|---|
| 1,796,265 | A | 3/1931 | Freudenberg et al. |
| 2,372,670 | A | 4/1945 | Hansley |
| 2,768,064 | A | 7/1954 | Baldridge |
| 3,387,933 | A | 6/1968 | Snyder |
| 3,617,218 | A | 11/1971 | Van Tamelen et al. |
| 3,998,941 | A | 12/1976 | Nelson |
| 4,327,071 | A | 4/1982 | Chiu et al. |
| 2010/0270500 | A1 * | 10/2010 | Taber et al. .............. 252/188.26 |

OTHER PUBLICATIONS

Taber et al., Potassium Hydride in Paraffin: A Useful Base for Organic Synthesis, J. Org. Chem., 2006, 71, pp. 8973-8974.

* cited by examiner

*Primary Examiner* — Joseph D Anthony
(74) *Attorney, Agent, or Firm* — RatnerPrestia

(57) ABSTRACT

A stable, homogeneous dispersion of potassium hydride is formed by reacting a mixture of wax and potassium metal with hydrogen.

9 Claims, No Drawings

METHOD OF MAKING STABLE, HOMOGENEOUS POTASSIUM HYDRIDE DISPERSIONS

CROSS-REFERENCE TO RELATED APPLICATIONS

This application claims priority from U.S. Provisional Application Ser. No. 61/171,629, filed Apr. 22, 2009, incorporated herein by reference in its entirety for all purposes.

GOVERNMENTAL RIGHTS

This invention was made with governmental support from the United States Government, National Institutes of Health (NIH), Grant GM 60287. The United States Government has certain rights in this invention.

FIELD OF THE INVENTION

The invention relates to methods by which potassium hydride may be produced.

DISCUSSION OF THE RELATED ART

Potassium hydride is a useful reducing agent and reagent for many different chemical reactions. Potassium hydride (KH) is a strong base that is more reactive than sodium hydride and that can be used to deprotonate organic molecules. Potassium hydride reacts with water according to the reaction:

$$KH + H_2O \rightarrow KOH + H_2$$

The reaction is so vigorous that often the hydrogen gas produced will, due to the heat of the reaction, ignite with the oxygen in the air. Potassium hydride is also pyrophoric, and requires careful handling. For this reason it is sold commercially as a slurry in mineral oil or other insert liquid solvent. In one study (Taber et al., *J. Org. Chem.* 2006, 71, 8973-8974) the compound is dispersed in paraffin to allow for better dispensing.

BRIEF SUMMARY OF THE INVENTION

A method of making a stable, homogeneous dispersion of potassium hydride is provided by the present invention. The method comprises mixing potassium metal and a wax that is solid at room temperature under an atmosphere comprised of hydrogen at a temperature effective to melt the wax and the potassium metal and for a time effective to convert the potassium metal to potassium hydride. The resulting product is solid at normal ambient temperatures and stable with normal handling and may be easily cut and weighed in air.

DETAILED DESCRIPTION OF CERTAIN EMBODIMENTS OF THE INVENTION

According to the invention, potassium hydride is prepared by treating potassium metal at an elevated temperature with hydrogen, in the presence of a wax. The temperature is selected so as to be above the melting point of both the potassium metal and the wax and sufficient to allow the desired reaction of the potassium metal with the hydrogen to proceed at an acceptably high rate.

Waxes suitable for use in the present invention may be any waxy substance that is solid at room temperature but capable of being melted and liquified at a temperature in excess of room temperature. The wax acts as a diluent or carrier for the potassium hydride and helps to protect the potassium hydride from oxygen and atmospheric moisture, thereby slowing down the conversion of the potassium hydride into other species and rendering the potassium hydride safer to handle and transfer. For example, the present invention permits the preparation of a potassium hydride-containing product that may be stored in air for at least four months with no observable loss of KH titer. The wax should be non-reactive towards potassium metal and potassium hydride. Preferably, the wax is saturated and non-reactive towards hydrogen under the conditions employed to convert the potassium metal to potassium hydride. In preferred embodiments of the invention, the wax is solid at normal ambient temperatures (i.e., 15-30° C.), has a melting point above about 45° C., has a relatively low viscosity when melted, is insoluble in water and/or is hydrophobic. Hydrocarbon waxes, particularly long chain alkanes and mixtures of different long chain alkanes, are especially suitable for use. In one embodiment of the invention, the melting point of the wax is not greater than about 70° C. In another embodiment of the invention, the wax is selected so as to provide a potassium hydride-containing product that is solid at normal ambient temperatures, yet capable of being readily divided up into smaller portions of a desired size by cutting methods or the like. Where the wax has a melting point substantially higher than room temperature, warming the product to a temperature somewhat above normal ambient temperature (e.g., to a temperature of 40 to 50° C.) will render the product more malleable and easier to divide. However, care should be taken to avoid reaching the temperature at which the product liquifies, as the homogeneity of the product may be lost.

In one embodiment of the invention, a wax or mixture of waxes is utilized which has a relatively broad melting point, e.g., a melting point range of at least about 2° C. The melting point range may be defined as the interval between the beginning of liquefaction and complete liquefaction. The use of a wax having such a relatively broad melting point range has been found to provide a potassium hydride-containing product that exhibits a soft ductile phase, preferably over a temperature range somewhat above ambient room temperature (e.g., about 45 to about 50° C.). Such characteristics enable the product to be readily divided and handled when heated to such temperature, as it will be relatively soft (i.e., neither a hard solid or a flowable liquid) yet will still maintain its homogeneity. In contrast, when a wax having a sharp melting point is used, the resulting product may transition quickly from a hard solid to a non-homogeneous liquid when warmed, making such product difficult to manipulate.

Suitable waxes include synthetic waxes, including mineral and petroleum waxes, for example, montan waxes, paraffin waxes, slack waxes, scale waxes, and microcrystalline waxes, and synthetic wax-like substances, such as polyethylene waxes, polypropylene waxes, and Fischer-Tropsch waxes. Natural waxes could also be used, provided that they do not contain functional groups that would react with the potassium metal or potassium hydride.

The relative weight amounts of potassium metal and wax may be varied as needed depending upon the concentration of potassium hydride desired in the final product. The present invention has the advantage of permitting the preparation of products having relatively high potassium hydride content, e.g., 40 to 60 weight % potassium hydride, although of course lower concentrations are also possible (e.g., 1 to 40 weight % potassium hydride).

If so desired, a catalyst may also be used to accelerate the rate at which the potassium metal is converted into potassium hydride. Any of the substances known to catalyze such conversions may be employed, including, for example, metals of Groups IV-B, V-B, and VI-B of the Periodic Table and their halides and hydrides (see U.S. Pat. No. 3,387,933, incorporated herein by reference in its entirety for all purposes), fatty acids (see U.S. Pat. No. 2,372,670, incorporated herein by reference in its entirety for all purposes), and potassium phenanthride catalysts (see U.S. Pat. No. 4,327,071, incorporated herein by reference in its entirety for all purposes).

The manner in which the potassium metal and wax are initially combined is not considered to be critical. In one embodiment of the invention, portions of the potassium metal are combined with melted wax. If the outside surfaces of the potassium metal portions are contaminated with oxide, mineral oil or the like, such contaminants are preferably removed prior to combining the wax and potassium metal portions. The wax/potassium metal mixture is placed in a suitable closed vessel that is capable of being pressurized and agitated. Suitable agitation means include, for example, stirring means such as a mechanical stirrer. The mixture is heated to a temperature effective to melt the wax and potassium metal and stirred or otherwise agitated so as to provide good mixing of the reactants and facilitate the formation of a homogeneous potassium hydride-containing product.

The potassium metal is contacted with hydrogen for a time and at a temperature effective to convert the potassium metal into potassium hydride. One way of accomplishing such contacting is to pressurize the vessel containing the wax/potassium metal mixture with hydrogen gas. Preferably, pure hydrogen gas is utilized, although mixtures of hydrogen gas with other gases such as nitrogen or argon could also be used. Generally speaking, the gas introduced into the vessel is comprised of at least 50 mole % $H_2$ and in one aspect of the invention consists essentially of $H_2$. In one embodiment of the invention, a head pressure of hydrogen gas of at least about 100 psi or at least about 250 psi or at least about 500 psi or at least about 750 psi is maintained. The vessel may be initially purged with hydrogen gas prior to heating the wax/potassium metal mixture to the desired temperature at which reaction with the hydrogen will be carried out. Such reaction temperature may vary depending upon a number of factors, including the presence or absence of a catalyst and the hydrogen pressure being employed, but should be in excess of the minimum temperature required to melt the wax and the potassium metal. Typically, temperatures of at least about 70° C. or at least about 85° C. or at least about 100° C. will be suitable. Generally speaking, it will not be necessary to employ temperatures greater than about 220° C. or greater than about 200° C. or greater than about 180° C. For example, the temperature can be suitably maintained within the range of from about 80° C. to about 160° C. during the time the hydrogen is being contacted with the wax/potassium metal mixture. Preferably, such contacting is conducted for a time sufficient to convert essentially all (e.g., >99%) of the potassium metal to potassium hydride. The extent of reaction may be conveniently monitored by observing whether the mixture continues to consume hydrogen. For example, if the head space pressure remains constant for an extended period of time, it is likely that complete conversion of the potassium metal has been achieved.

While the hydrogen is being contacted with the potassium metal, it will generally be advantageous to continue to mix or agitate the reaction mixture. Subjecting the mixture to continued (continuous) mixing or agitation will typically be desirable, since this will improve the homogeneity of the final product and also increase the rate of conversion of the potassium metal.

Once the desired degree of potassium metal conversion has been achieved, the mixture is cooled to ambient temperature to yield the potassium hydride-containing solid product. During such cooling, it will be advantageous to continue to mix or agitate the product until solidification occurs so that homogeneity is maintained (i.e., settling out of the potassium hydride is avoided).

EXAMPLES

Paraffin wax (for canning, MP=48-50° C., 50 g) was warmed to melting in a 300 mL glass jar. To the melted wax was added freshly cut potassium metal (cylindrical rods in mineral oil, scraped free of oxide layer mineral oil, 48.75 g) in ~10 g pieces. Once the oxide layer and mineral oil were removed from the potassium, the metal is rapidly weighed and transferred under the melted paraffin. The jar was then placed in a Parr reactor equipped with a mechanical stirrer and heating mantle. After being purged with $H_2(g)$, the temperature was increased to 120° C. At temperature, the reactor was charged to 1000 psi $H_2(g)$ and stirred at 450 rpm. The reactor was periodically recharged to 1000 psi as $H_2(g)$ was consumed. Once the pressure remained above 900 psi without further $H_2(g)$ addition, the mixture was stirred for a further 12 hours at 120° C. After cooling to 60° C., the jar was removed from the Parr reactor and manually homogenized (using the mechanical stirrer from the Parr reactor) as it solidified. At the point when homogenization with the mechanical stirrer was no longer possible due to the viscosity of the material, the vessel was capped and manually rolled on a cool flat surface until it reached room temperature. Once cooled to room temperature, the KH-containing product was titrated as per Taber et al., *J. Org. Chem.*, 2006, 71, 8973-8974. At 55° C. the material is completely melted, the KH settles and homogeneity is lost. At 48° C. the material is malleable enough to be molded or removed without difficulty, but the KH does not settle out (i.e., homogeneity is maintained). An average of two titrations was within +/−5% of the expected titer (trial 1: +4.3%; trial 2: −4.9%).

What is claimed is:

1. A method of making a stable, homogeneous dispersion of potassium hydride in a wax that is solid at room temperature, wherein the method comprises mixing potassium metal and the wax under an atmosphere comprised of hydrogen at a temperature effective to melt the wax and the potassium metal and for a time effective to convert the potassium metal to potassium hydride.

2. The method of claim 1, wherein the wax is paraffin wax.

3. The method of claim 1, wherein in an initial step solid portions of potassium metal are combined with melted wax.

4. The method of claim 1, wherein the temperature is at least about 80° C.

5. The method of claim 1, wherein the mixing is conducted in a vessel under a head pressure of hydrogen gas of at least about 500 psi.

6. The method of claim 1, comprising an additional step of cooling to a temperature effective to solidify the wax.

7. The method of claim 1, comprising an additional step, following conversion of the potassium metal to potassium hydride and the formation of a mixture of melted wax and potassium hydride, of cooling the mixture while continuing to mix the mixture so as to maintain a homogeneous distribution of the potassium hydride.

8. The method of claim 1, wherein the wax has a melting point range of at least about 2° C.

9. The method of claim 1, wherein the dispersion of potassium hydride in wax exhibits a soft ductile phase over a temperature range above ambient room temperature.

\* \* \* \* \*